US009339041B2

(12) United States Patent
Vangeepuram et al.

(10) Patent No.: US 9,339,041 B2
(45) Date of Patent: May 17, 2016

(54) PRODUCTION OF COOKIES HAVING LARGE PARTICULATES USING ULTRASONIC WIRECUTTING

(71) Applicant: KRAFT FOOD GLOBAL BRANDS LLC, Northfield, IL (US)

(72) Inventors: Srinivas Vangeepuram, Kendall Park, NJ (US); Mihaelos Nicholas Mihalos, Palisades Park, NJ (US); Theodore N. Janulis, Randolph, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 665 days.

(21) Appl. No.: 13/852,751

(22) Filed: Mar. 28, 2013

(65) Prior Publication Data
US 2013/0216639 A1    Aug. 22, 2013

Related U.S. Application Data

(62) Division of application No. 12/183,776, filed on Jul. 31, 2008, now Pat. No. 8,431,172.

(51) Int. Cl.
*A23G 7/00* (2006.01)
*A21C 5/00* (2006.01)
(Continued)

(52) U.S. Cl.
CPC . *A21C 5/00* (2013.01); *A21C 11/10* (2013.01); *A21C 11/16* (2013.01); *A21D 8/02* (2013.01);
(Continued)

(58) Field of Classification Search
CPC .......... A21C 5/00; A21C 11/10; A21C 11/16; B26D 3/28; B26D 7/086; B26D 7/32; B26D 2003/285; Y10T 83/9292; A21D 8/02; A21D 13/0019; A21D 1/547; A21D 3/28
See application file for complete search history.

(56) References Cited

U.S. PATENT DOCUMENTS 3,817,141 A    6/1974    Smonetti
4,910,029 A    3/1990    Thulin et al.
(Continued)

FOREIGN PATENT DOCUMENTS

EP    0543628    5/1993
EP    0768153    4/1997
(Continued)

OTHER PUBLICATIONS

Dukane Corporation, St. Charles, Illinois, Brochure "Intelligent Assembly Solutions" Machine Mounted Probes 15kHz-70kHz. 2pgs. Date, downloaded 2008.
(Continued)

*Primary Examiner* — Steven Leff
(74) *Attorney, Agent, or Firm* — Greenblum & Bernstein, P.L.C.

(57) ABSTRACT

A method for the continuous production of cookies having a high content of large inclusions, such as chocolate chips, nuts, and fruit pieces includes extruding a cookie dough containing the inclusions through a die orifice to obtain an extrudate dough rope, and cutting the extrudate dough rope with an ultrasonic cutting blade. The ultrasonic cutting severs the extrudate dough rope into dough pieces which fall onto a moving conveyer into a substantially uniform or regular array for uniform baking. The ultrasonic cutter is controlled to provide a roughened top surface on a dough piece to provide a home baked appearance upon baking, while cutting through the inclusions without substantial displacement of the inclusions which would cause pock marks on the surface of the dough piece, and without substantial dough piece weight variation.

20 Claims, 3 Drawing Sheets

(51) Int. Cl.
*A21C 11/10* (2006.01)
*A21C 11/16* (2006.01)
*A21D 8/02* (2006.01)
*A21D 13/00* (2006.01)
*B26D 1/547* (2006.01)
*B26D 7/08* (2006.01)
*B26D 3/28* (2006.01)
*B26D 7/32* (2006.01)

(52) U.S. Cl.
CPC ............ *A21D 13/0019* (2013.01); *B26D 1/547* (2013.01); *B26D 7/086* (2013.01); *B26D 3/28* (2013.01); *B26D 7/32* (2013.01); *B26D 2003/285* (2013.01); *Y10T 83/9292* (2015.04)

(56) References Cited

U.S. PATENT DOCUMENTS

| | | | |
|---|---|---|---|
| 4,988,276 A | 1/1991 | Moeller | 425/290 |
| 5,620,713 A | 4/1997 | Rasmussen | |
| 5,768,970 A | 6/1998 | Wolf et al. | 83/701 |
| 5,770,241 A | 6/1998 | Tuzzio et al. | 425/232 |
| 6,032,561 A | 3/2000 | Lonn et al. | |
| 6,431,849 B1 | 8/2002 | Capodieci | |
| 6,530,768 B1 | 3/2003 | Harrop | |
| 6,561,235 B2 | 5/2003 | Finkowski et al. | |
| 6,627,241 B1 | 9/2003 | DeNars et al. | |
| 6,715,518 B2 | 4/2004 | Finkowski et al. | |
| 7,067,167 B2 | 6/2006 | Damsgard et al. | |
| 7,264,836 B2 | 9/2007 | McHugh et al. | |
| 8,431,172 B2 | 4/2013 | Vangeepuram et al. | |
| 2003/0003207 A1 | 1/2003 | Capodieci | |
| 2003/0035876 A1 | 2/2003 | Kostival et al. | |
| 2004/0151807 A1 | 8/2004 | Damsgard | 426/87 |
| 2005/0196505 A1 | 9/2005 | Hayes-Jacobson et al. | |
| 2006/0263504 A1 | 11/2006 | O'Connor et al. | |
| 2007/0172559 A1 | 7/2007 | Capodieci | |

FOREIGN PATENT DOCUMENTS

| | | |
|---|---|---|
| EP | 712699 | 5/1998 |
| JP | 8-1587 | 1/1996 |

OTHER PUBLICATIONS

Dukane Corporation, St. Charles, Illinois, Brochure "Process Control for Every Need" Ultrasonic Welders. (2003). 2pgs.

Dukane Corporation, St. Charles, Illinois, Brochure "Ultrasonic Food Processing". 2pgs. Date, download 2008.

Dukane Corporation, St. Charles, Illinois, Brochure "Intelligent Assembly Solutions" IQ Series Ultrasonic Generator/Power Supply. 4pgs. Date, downloaded 2008.

Dukane Corporation, St. Charles, Illinois, Brochure "Intelligent Assembly Solutions" 20 kHz Sealed Transducer. 2pgs. Date, downloaded 2008.

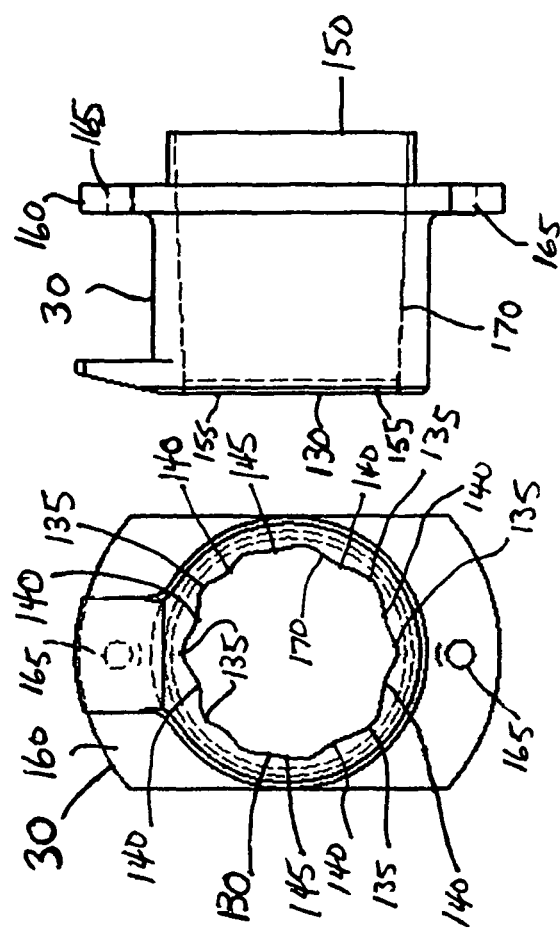
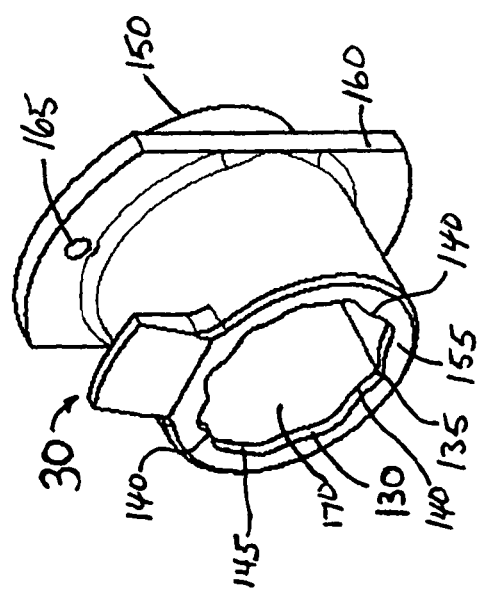
FIG. 6
FIG. 5
FIG. 4

PRODUCTION OF COOKIES HAVING LARGE PARTICULATES USING ULTRASONIC WIRECUTTING

RELATED APPLICATIONS

This application is a division of U.S. application Ser. No. 12/183,776, filed Jul. 31, 2008, the disclosure of which is incorporated by reference herein in its entirety.

FIELD OF THE INVENTION

The present invention generally relates to the continuous production of cookies having a high content of large inclusions, and more particularly, to methods and apparatus for mass producing cookies having a high content of large inclusions such as chocolate chips, nuts, and fruit pieces, using ultrasonic wirecutting to achieve reduced dough weight variation and a home baked appearance.

BACKGROUND OF THE INVENTION

Traditionally in the mass production of cookies, wirecutting unit operations may be used to cut dough pieces to the proper weight and deposit them on an oven band prior to baking unit operations. Achieving uniform dough weights is needed to assure uniform baking, so that dough pieces which are too thin are not overbaked, and dough pieces which are too thick are not underbaked. Conventional wire cutting operations employ a wire or blade which cuts across a plurality of extruded dough ropes to obtain dough pieces which are deposited on a moving belt. Depositing the dough pieces so that they form a regular pattern of rows across the belt and along the belt is also needed to assure uniform baking because dough pieces which are close together bake differently from those that are far apart.

However, in recent years consumers have requested more indulgent type products which contain large size particulates or inclusions such as raisins, nuts, and confectionary chips or chunks or flavor chips, such as chocolate chips or chunks. Home-baked chocolate chip cookies are generally baked from a dough having the chocolate chips dispersed throughout the dough. The dough is subdivided into spoon size pieces and dropped onto a baking sheet. A typical recipe provided on the packaging of store-bought chocolate chips calls for about one cup of chocolate chips and about 2.5 cups of other chocolate chip cookie ingredients. This rather large proportion of chocolate chips, the generally large size of the chocolate chips (bottom diameter of about 0.4 in.) and the dough piece size assure the attainment of cookies having a plurality of chocolate chips which have a portion which is visually apparent.

Wire-cutting machines are generally used for the mass production of chocolate chip cookies from a dough, which like a dough prepared at home, contains the chocolate chips dispersed throughout prior to dough piece formation. On a wire-cutting machine, an extrudate rope is cut into disc-shaped dough pieces having visually apparent chocolate chips, which may be baked to provide cookies having visually apparent chocolate chips.

Conventional wire-cutting machines, however, cannot be used to consistently mass produce cookie dough pieces with substantially uniform dough weights having a desirable large amount of large particulates such as chocolate chips. As the size and amount of particulates or inclusions are increased, the resistance to cutting increases and there is less dough through which the resistant pieces may move upon contact with the wire or blade. As a result, the large particulates tend to be dragged across the cookie dough surface or are partially cut or removed or displaced from the dough piece. The dragging and loss of whole or portions of the particulates creates undesirable craters or pock marks in the dough pieces and in the final baked product. In addition, the increased resistance to cutting, and the displacement or loss of particulates causes substantial variation in dough piece weight, and causes the dough pieces to fall in a more irregular pattern. For example, dough piece variation may be 20% by weight or more, and dough pieces may be caused to fall on each other or fall close enough to each other so that when they are baked and spread in the oven, the pieces touch each other, producing a "double" or a "triple" cookie. Also, particulates or portions thereof may be displaced or dislocated from a dough piece, along with adherent dough so that it becomes part of remains with the dough rope and the subsequently cut dough piece. Uniform baking and packaging suffer as a consequence of the non-uniform dough weights and non-uniform dough piece array.

Furthermore, typical wire cutting operations involve using a wire or blade which would generate buildup of material or breakage of the blade or wire when attempting to produce doughs with large amounts of large particulates, thereby requiring frequent shutdowns to clean or replace the blades. These problems are further exacerbated when employing sticky or low fat doughs.

While commercially available confectionary or flavor chips or chunks, such as chocolate chips or chunks may have particle sizes of about 500 to about 10,000 counts or chips per pound (where the higher the count per pound, the smaller is the size of the chip), commercial wire cutting operations are generally limited to flavor chips having a particle size of about 3,500 to about 10,000 counts per pound, for example from about 4,000 to about 5,000 counts per pound.

Ultrasonic cutting has been employed to provide smooth cutting of foods such as baked goods or doughs. Also, ultrasonic molding has been employed for precise molding and improved mold release in the production of foods such as baked goods or doughs.

For example, U.S. Pat. No. 6,431,849 discloses production of confectionary products from strips or ropes which may include puffed cereal and candied fruit bits, dry fruits, nuts, or the like. The products are made using an ultrasonic mold to achieve a precise texture, finish or detail.

U.S. Patent publication no. 2005/0196505 discloses ultrasonically cutting a coextruded dough rope where a specific pattern or ornamental design is produced. The conveyor employed for transporting the cookie dough units, as described in referenced U.S. Pat. Nos. 6,561,235 and 6,715,518, raises to support the bottom of the dough rope as the dough rope is cut.

Cutting with an ultrasonic blade, or molding, forming, or imprinting with an ultrasonic forming tool of foods, such as dough or baked goods is disclosed in U.S. Patent Publication Nos. 2003/0035876, 2005/0496505, 2006/0263504, and 2007/0172559, and U.S. Pat. Nos. 3,817,141, 5,620,713, 6,530,768, 6,561,235,6,627,241, 6,715,518, 7,067,167, and 7,264,836. However, the purpose of the ultrasonic cutting is to provide clean smooth cuts, so as not to disturb coextruded patterns or areas adjacent to the cut. Providing clean, smooth cuts detracts from the attainment of a home-baked cookie appearance where surface cracks and varying topography are desirably present. Also, the purpose of the ultrasonic forming is to mold or imprint foods into a specific shape while avoiding sticking so as to improve mold release. However, use of a mold provides regular, cookie cutter shapes, and smooth surfaces rather than a home baked appearance of randomly irregular shapes and random topography.

Cutting through dough ropes having large inclusions such as chocolate chips, nuts and dried fruits, so as to sever the dough rope and provide dough pieces which are bakeable to a home-baked, random irregular appearance with surface cracks and highly visible particulates is not disclosed and would be contrary to achieving a specific coextruded pattern, or molded or imprinted designs.

In addition, in the processes of the references, the ultrasonic cutting is performed with the food product being supported on its bottom side, such as ultrasonically cutting of the food when it is on a conveyor. None of the references relate to ultrasonically cutting substantially vertically oriented dough ropes and permitting the dough pieces to fall onto a moving conveyor in an array of rows for baking without substantial deformation of the dough pieces, while achieving substantially reduced dough weight variation.

The present invention provides methods and apparatus for the continuous, mass production of cookies having a high content of large inclusions or particulates, such as chocolate chips, nuts, and fruit pieces, using ultrasonic wirecutting to achieve reduced dough weight variation and a home baked appearance. The methods of the present invention avoid or eliminate buildup on the cutting blades, distortion of the dough pieces, and excessive deformation of the dough piece surfaces caused by dragging of particulates, as well as breaking of the wire or blade. Additionally, substantial improved control of the dough weights, substantial reduction in waste such as caused by "doubles" and "triples," and a more uniformly baked, packageable final product are achieved with the methods of the present invention.

SUMMARY OF THE INVENTION

In a first aspect of the invention, cookies having a high content of large inclusions are continuously produced by extruding a substantially homogenous cookie dough having a high content of large inclusions through a die aperture above a moving conveyor to provide a vertically oriented dough rope. In embodiments of the invention, the cookie dough may have an inclusion content of from about 20% by weight to about 60% by weight, based upon the total weight of the dough, and the inclusions may have a particle size of from about 500 count/lb to about 1000 count/lb. The vertically oriented dough rope is ultrasonically cut to obtain dough pieces having a roughened top surface while cutting through inclusions so that the dough pieces fall onto the moving conveyor with the roughened top surface facing upward.

Dough piece surface roughness may be controlled by varying the power supply to the ultrasonic cutting blade, or the amplitude of the ultrasonic cutting blade. The surface roughness is achieved without undesirable distortion of the dough pieces, or excessive deformation of the dough piece surfaces caused by dragging of particulates or loss of the particulates, which would cause pock marks on the surface of the dough piece. Also, buildup of dough and particulates on the cutting blade, and breaking of the cutting blade are avoided. In embodiments of the invention, the dough weight variation from dough piece to dough piece may be less than about 10% by weight, based upon the weight of the dough piece.

The dough pieces may be transported on the moving conveyor to an oven, in an at least substantially uniform array and baked into cookies having a cracked top surface and inclusions which extend above the baked cookie dough top surface. Even though the cookies are mass produced they possess a home-baked appearance. The method of the present invention achieves very low dough piece weight variation, and the pieces fall in a uniform array on the conveyor which promotes a uniform bakeout, substantially reduces or eliminates the formation of doubles, and reduces waste. The method of the present invention may be employed with full-fat doughs as well as low fat doughs and sticky doughs.

In another aspect of the invention, a method for reducing dough weight variation in the continuous production of cookies having a high content of large inclusions comprises providing a cookie dough with an inclusion content of from about 20% by weight to about 60% by weight, based upon the weight of the total weight of the dough, and an inclusion particle size of from about 500 count/lb to about 1000 count/lb, and extruding the cookie dough through a die orifice to obtain an extrudate rope. Also, the method for reducing the dough weight variation includes cutting the extrudate rope with an ultrasonic cutting blade to sever the extrudate rope into dough pieces which fall onto a moving conveyer without substantial deformation of the dough pieces, and baking the dough pieces.

BRIEF DESCRIPTION OF THE DRAWINGS

The present invention is described in the detailed description which follows, in reference to the noted plurality of drawings by way of non-limiting examples of exemplary embodiments of the present invention.

FIG. 4 shows a perspective view of a die insert which may be employed with the wirecutting apparatus of FIG. 1.

FIG. 5 shows a bottom view of the die insert of FIG. 4.

FIG. 6 shows a right side view of the die insert of FIG. 4.

DETAILED DESCRIPTION OF THE INVENTION

Figure 1:
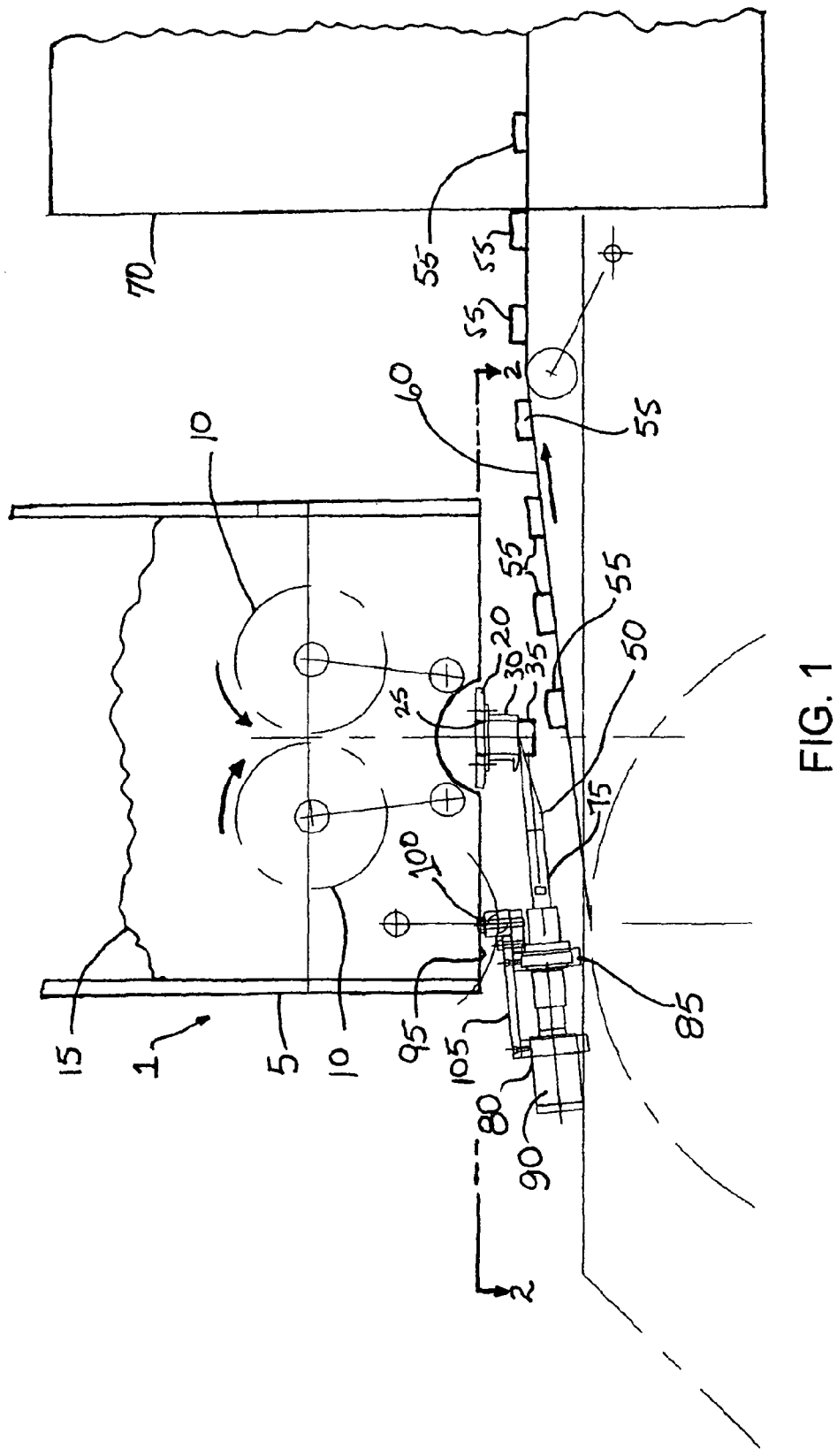
FIG. 1 schematically shows an ultrasonic wirecutting apparatus which may be employed for the continuous production of cookies having a high content of large inclusions in accordance with the present invention.

The present invention generally relates to the continuous production of cookies having a high content of large inclusions, and more particularly, to methods for mass producing cookies having a high content of large inclusions such as chocolate chips, nuts, and fruit pieces, using ultrasonic wirecutting to achieve reduced dough weight variation and a home baked appearance.

Generally, inclusions or particulates in a cookie dough provide more resistance to cutting than does the dough in which they are included. As the size and amount of particulates or inclusions in a dough increase, their resistance to cutting and the resistance of the dough composition to cutting increase. If insufficient energy or power is supplied to the ultrasonic cutting blade, the particulates may be substantially displaced, relative to their position in the dough prior to cutting. The power level and amplitude of the ultrasonic cutter may generally be high enough to easily cut through doughs and their particulates or inclusions to provide a clean smooth cut. However, it has been found that if the power level and amplitude are too high, the cut is generally so smooth that cookies baked from the smooth-surfaced, cut dough pieces exhibit a smooth, shiny appearance which detracts from a creviced, or cracked, varied topography of a home-baked cookie made from a spooned dough.

In embodiments of the invention, the ultrasonic wirecutter is operated at power levels and amplitudes controlled to cut or sever one or a plurality of vertically oriented dough ropes so that both the dough mass and its inclusions or particulates are cut through from end to end. In addition, the ultrasonic cutting is controlled so that the inclusions or particulates are cut through at high enough powers and amplitudes so that they not substantially pushed or displaced through the dough to an extent that they are removed or leave a pock mark, crater, or trail in the dough surface. Moreover, the ultrasonic cutting is also controlled so that the power level and amplitude of the cutting provide a roughened surface to the severed dough piece. The roughened dough surface helps to achieve a non-smooth, non-glossy or non-shiny appearance and random surface cracks or crevices and a random varied topography as in home baked, spooned cookies. Generally, in embodiments of the invention, the roughened dough surface may have a topography similar to that of coarse sandpaper so as to avoid a glassy appearance.

In addition, the ultrasonic cutting employed in the present invention does not substantially displace the severed piece from a downwardly or vertically directed path. The severed pieces fall flat on a moving conveyor, and not on edge or on each other. They fall with a roughened top surface in a regular pattern of straight rows for uniform baking. Moreover, the dough pieces are cut in substantially equal weights, with dough piece weight variation in embodiments of the invention of less than about 10% by weight being achieved.

In embodiments of the invention, the power supply to the ultrasonic cutting blade, and the amplitude of the ultrasonic cutting blade may be controlled and varied to produce surface roughness on the dough pieces. The ultrasonic cutter may vibrate at a frequency of about 20,000 kilohertz or 20,000 cycles per second, or more, for example up to about 30,000 kilohertz to about 40,000 kilohertz. Generally, the whole blade expands and contracts, like a rubber band, from the energy input, and the range of that motion, or amplitude, may be 20 microns, and with a 1.5 booster gain may be 30 microns. At high power inputs and high amplitudes, friction is reduced and the dough is cut with less resistance and a smooth, glassy cut is obtained. In accordance with embodiments of the present invention, the amplitude is reduced so that the blade does not expand and contract as much, the velocity is reduced, and a rougher cut or rougher surface is achieved at a given frequency. The amplitude may be changed, or reduced in accordance with the present invention by lowering the booster unit output level and with electronic controls on the power supply. The amplitude may be changed mechanically and may also be fine tuned, e.g. in 1% increments from 100% to 20%, with electronic controls by a skilled operator in known manner. The power supply may be analogue or digital, and may be adjusted by a skilled operator in known manner.

In accordance with preferred embodiments of the present invention, to achieve reduction in amplitude which provides a desirable surface roughness, the power booster may be reduced or set at from about 35% to about 65%, more preferably from about 40% to about 60%, of its maximum capacity (100% setting). For example, for a blade amplitude of 20 microns peak to peak, and a booster gain of 1.5, reducing the booster to 60% may result in an amplitude of about 18 microns of motion (20 microns×0.6×1.5=18 microns). In exemplary embodiments of the invention, for a booster gain of 1.5, the amplitude of blade motion may be 10 microns to 19 microns, preferably from 12 microns to 18 microns.

In addition, to produce dough piece surface roughness, in embodiments of the invention, the power supply to the ultrasonic cutting blade, and the amplitude of the ultrasonic cutting blade may be controlled at a fixed reduced level, or may be varied as the cutter travels or cuts across the dough rope to produce the dough pieces.

Commercially available ultrasonic cutter components and blades may be employed in the present invention. Exemplary ultrasonic cutting equipment which may be used is manufactured by Dukane Corporation, St. Charles Ill. The ultrasonic components which may be used include: a) an ultrasonic generator/power supply which converts line voltage into a 20, 30, or 40 kHz signal that is sent to an ultrasonic converter, b) a sealed ultrasonic converter which converts the generator signal into mechanical motion through the use of piezoelectric crystals (approximately 20µ of amplitude peak to peak, c) a booster which is used to maintain, decrease or increase the amplitude of the cutting blade/horn, and also acts as a mounting point for integration, and d) an ultrasonic cutting blade which is connected to the booster, which are generally used for guillotining or slitting products. Exemplary ultrasonic cutting blades are half wave guillotine, half wave edge guillotine, full wave guillotine, and full wave wedge guillotine cutting blades. Preferred ultrasonic cutting blades for use in the present invention are a half wave guillotine cutting blade, and a half wave wedge guillotine cutting blade which come in standard lengths ranging from 6 inches to 14 inches, manufactured by Dukane Corporation.

The ultrasonic cutter may be mounted on a conventional wirecutting machine, such as a wirecutter manufactured by APV Baker, Baker Perkins Group Ltd. Each wirecutting machine may be fitted with one or more than one ultrasonic cutting blade, with each blade having its own ultrasonic components including an ultrasonic power supply, converter, and booster, so that the amplitude of each blade may be adjusted independently. In embodiments of the invention, oven bands may be 36 inches wide or more, which would be too wide for a single ultrasonic blade to effectively span, because amplitude may diminish too much as the distance along the blade increases from the location of the blade mounting section. Where multiple blades and ultrasonic cutting components are employed on a single wirecutting device, the ultrasonic cutting devices and their blades may be journaled or connected together or mounted or attached to a single reciprocating mechanism to synchronize their movement for cutting a plurality of at least substantially vertically oriented extrudate dough ropes. The synchronization of the movement of the blades is such so that all of the blades contact and cut one or a plurality of different extrudate ropes at least substantially simultaneously so that the cut dough pieces fall in an at least substantially uniform straight row across the oven band. For example, for a 36 inch wide band, three ultrasonic cutting blades and their three ultrasonic cutting units may be employed to simultaneously cut a plurality of dough ropes which are extruded from a plurality of wirecutter dies arranged across the wirecutter and across the conveyer band. Generally, each blade employed in embodiments of the invention may have a length of about 12 inches, and 3 or 4 blades may be employed across an oven band.

The mounting of the ultrasonic cutter on the wirecutter may be so that the cutting of the dough rope preferably occurs in the same direction that the underlying conveyor belt and cut dough pieces thereon are moving. However, in embodiments of the invention, the ultrasonic cutter may be mounted 180°, so that the cutting of the dough rope occurs in the direction opposite to the movement of the underlying conveyor belt and cut dough pieces which have fallen upon the conveyor.

The reciprocating mechanism of the wirecutter, may move the ultrasonic cutting blade and its components so that the ultrasonic cutting blade travels in a looped path to cut the dough rope at the wirecutter die aperture. In preferred embodiments, the ultrasonic cutting blade may travel in a curved or elliptical path or gradual arc, so that the blade cuts across the dough rope first in an upward direction as the leading edge of the blade first encounters the dough rope, and then in a downward direction as the leading edge of the blade leaves the dough rope. The upward cutting, towards the die aperture may reverse to the downward cutting away from the die aperture, at about 60% to about 90% across the maximum width, thickness, or diameter of the dough rope or die aperture. The downward motion helps to cleanly separate the dough piece from the remaining portion of the extrudate rope so that the severed dough does not tend to momentarily stick or reattach to the dough rope from which it is being severed and hinder and adversely affect its vertical or straight down fall into a straight row and array.

In preferred embodiments, the dough rope is cut by the ultrasonic blade as close as possible to the die orifice without contacting the die. This cutting of the dough rope at the die aperture helps to reduce movement of the dough rope in the direction of travel of the blade because the internal walls of the die passageway support the rope against lateral movement. As the distance away from the die orifice increases, the vertically oriented dough rope has more flexibility and swaying room, and less support from the internal walls of the die passageway. Accordingly as the cutting distance from the die orifice increases, the dough pieces tend to fall in a more irregular pattern. In preferred embodiments, upon cutting the dough rope the top edge of the blade may be at a distance of less than about $20/1000$ inches, preferably less than or equal to about $10/1000$ inches from the die aperture.

The distance between the wirecutter die aperture or orifice and the underlying conveyor belt should be large enough to permit the ultrasonic cutting blade to move in its reciprocating looped path. However, shorter distances are preferred to reduce the possibility of the dough pieces turning or flipping as they fall, or falling out of alignment with each other on the conveyor belt. In embodiments of the invention, the distance the pieces may be permitted to fall from the die aperture or exit to the underlying conveyor belt or band may be from about 1.5 inches to about 12 inches, for example from about 2 inches to about 6 inches, preferably about 2 inches.

Generally, commercially available wire cutters contain a circular die orifice or aperture, which results in dough pieces and cookies which have regular, circular shapes or peripheries which provide a cookie cutter type or mass produced appearance, rather than a spooned, home-baked irregular circumference. While the wirecutter die apertures or orifices employed in the present invention may have any shape, such as circular, or other regular shapes, or designs, in preferred embodiments, to obtain a more home-baked, spooned cookie appearance the die orifice employed in the present invention may have an irregular shape. The irregularly shaped die aperture or orifice may provide dough pieces having a curvilinear perimeter so that upon baking the dough pieces are baked into cookies having a curvilinear periphery.

In embodiments of the invention a die insert may be employed to provide an irregular circumference to the dough rope and the cookies baked from the severed dough pieces. The curvilinear die aperture, and curvilinear perimeter of the dough rope and cookies produced therefrom may be made up of a plurality of alternating concave, convex, and linear portions or sections of varying length. The concave and convex curved portions may have different radii of curvature or differently shaped arcs to provide a random, spooned cookie shape, periphery, or circumference. In embodiments of the invention, the number of differently shaped portions or sections of the die orifice, and dough pieces and cookies produced therewith may be at least about 10, preferably at least about 15, for example from about 18 to about 23.

The die insert may have a circular input end which fits into the circular die of the wirecutter, and an opposing output end which contains the irregularly shaped curvilinear die aperture. A flange may be provided for securing or attaching the die insert to the wirecutter with bolts or other fastening devices which pass through holes in the flange. In preferred embodiments, the die insert may have an inner passageway which tapers inwardly or narrows from the circular input end to the irregular output end. The tapered passageway helps to compress the dough and conform it to the irregular shape of the die exit orifice. In embodiments of the invention the amount of taper may be less than about 10°, preferably less than about 5°, for example from about 2° to about 4° from the longitudinal axis of the passageway of the die or die insert.

In embodiments of the invention a linear air nozzle or "air knife" may be employed to provide air to the ultrasonic cutting blade surfaces to keep them clean. During prolonged cutting, small fines from cutting of the dough and the inclusions tend to build up on the blade surfaces which may adversely affect cutting efficiency. If the fines sit on the blade surface too long, they may begin to melt or cook due the heat generated on the blade from the ultrasonic vibration. The air knife may apply a gentle curtain of air to the top of the ultrasonic blade surface as the blade changes its direction from retraction to forward in the cutting cycle or loop. Application of the air curtain to the blade may be synchronized with the position of the blade in its travel path using known synchronization techniques.

An air knife may be provided for each ultrasonic blade and may be mounted on the wirecutter, underneath and upstream of the dies in a fixed position over each of the ultrasonic blades. In embodiments of the invention the air pressure employed with the air knife may be from about 5 psig to about 20 psig, for example about 10 psig to about 15 psig. Linear air nozzles or air knives which may be employed in the present invention are commercially available, such as a Linear Air and Blow-Off Nozzle, made by Exair Corporation of Cincinnati, Ohio.

FIG. 1 schematically illustrates an ultrasonic wirecutting apparatus 1 which may be employed for the continuous production of cookies having a high content of large inclusions in accordance with the present invention. As illustrated in FIG. 1, the wirecutting apparatus 1 can comprise a hopper 5 provided with a pair of counter-rotating feed rollers 10 positioned at a lower portion thereof for feeding cookie dough 15 from the hopper through a die plate 20. The direction of rotation of the counter-rotating feed rollers 10 is indicated by arrows. Positioned below the counter-rotating feed rollers 10 can be provided a wire cutter die or die plate 20 having one or more die orifices 25 with a die insert 30 inserted in each die orifice for extruding one or more ropes 35. In an alternative arrangement of the wirecutting apparatus 1, the counter-rotating feed rollers 10 may be replaced with another type of feeding mechanism for feeding and forcing the cookie dough through the die inserts 30. For example, the counter-rotating feed rollers can be replaced with a spiral screw conveyor.

The die orifices 25 and die inserts 30 can be located beneath the counter-rotating feed rollers 10, and an ultrasonic cutting blade 50 can be positioned below the die insert 30. The cookie dough 15 is formed into ropes 35 by the wire cutter die insert 30, which are then cut into individual pieces 55 by the ultrasonic cutting knife or blade 50. The individual pieces 55 can be substantially uniformly received by conveyor 60 and transferred to an oven 70 and packager (not shown).

Figure 2:
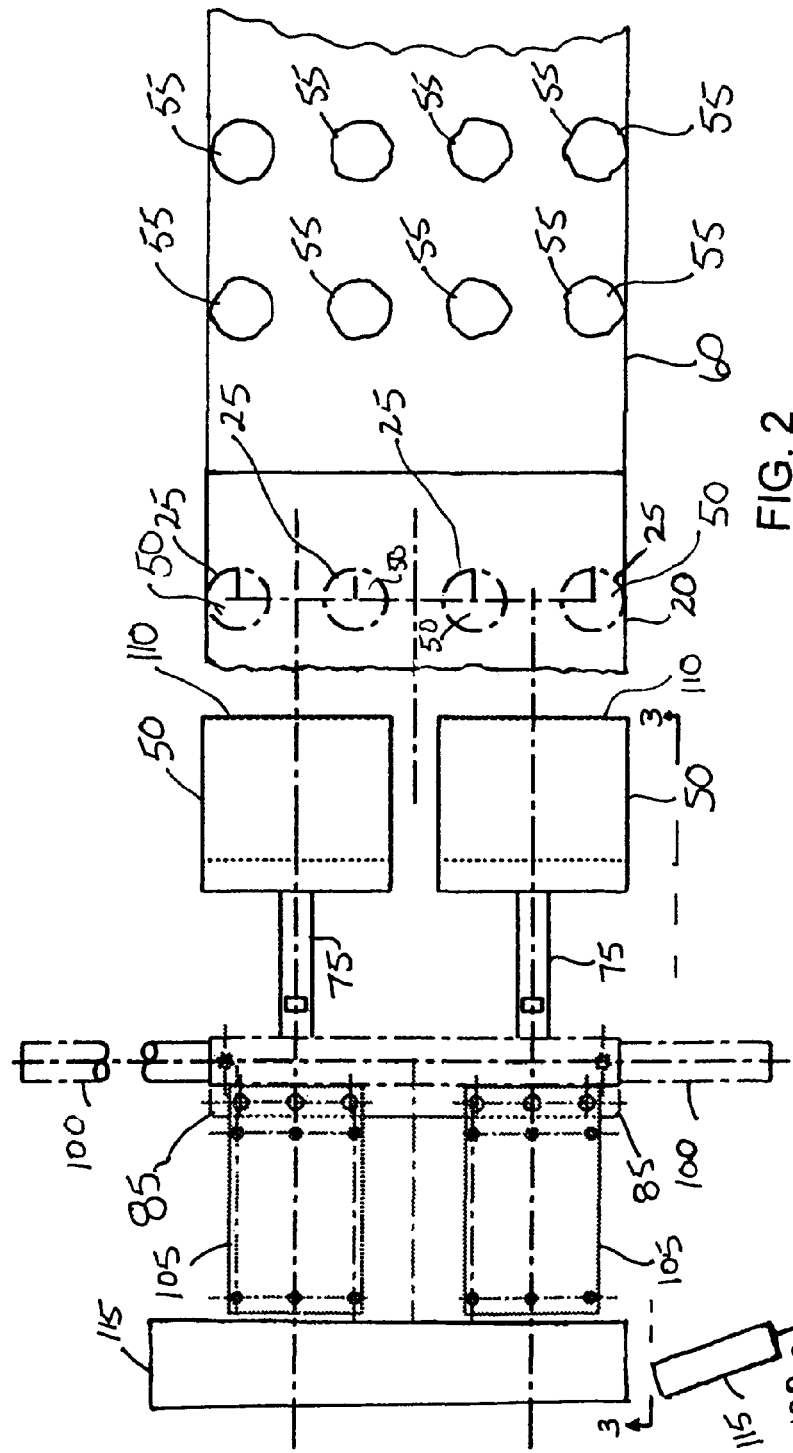
FIG. 2 schematically shows a top cross sectional view of the wirecutting apparatus of FIG. 1 along line 2-2.
Figure 3:
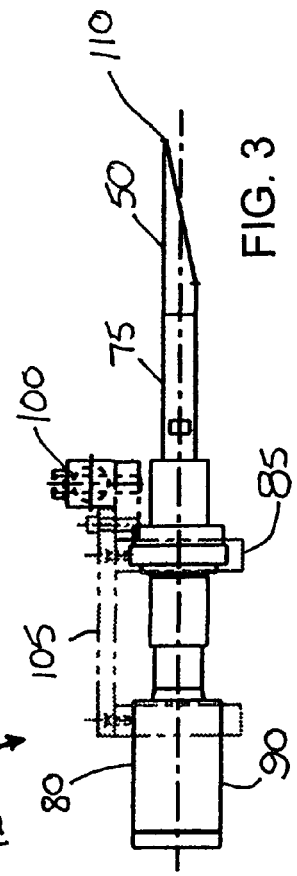
FIG. 3 schematically shows a side view of the wirecutting apparatus of FIG. 2 along line 3-3.

As shown in FIGS. 1, 2, and 3, the ultrasonic cutting blade 50 may be attached to the horn 75 of an ultrasonic cutter assembly 80, which may include a booster 85, and a transducer 90. The ultrasonic cutter assembly 80 may be mounted at the underside or bottom 95 of the wirecutter 1 to the reciprocating mechanism 100 of the wirecutter 1 for moving the ultrasonic cutting blade 50 in a looped path. A knife mounting assembly 105 may be used to attach, connect, or mount the ultrasonic cutter assembly 80 to the wirecutter reciprocating mechanism 100 with conventional fastening devices such as bolts and nuts, screws, and conventional fittings.

As schematically shown in FIGS. 2 and 3, two or more ultrasonic cutter assemblies 80 may be mounted on the knife mounting assembly 105 with the leading edges 110 of the ultrasonic knives or blades aligned for simultaneous travel across the die orifices 25 and die inserts 30 for simultaneous cutting of a plurality of dough ropes 50. As shown in FIG. 1 and FIG. 2, the dough ropes 50 are cut into a plurality of dough pieces 55 using a reciprocating motion of the ultrasonic blade 50, and the dough pieces 55 fall onto conveyor 60 in a substantially uniform array of substantially uniformly spaced rows across the width of the conveyor belt 60 and along the length of the conveyor belt 60.

Additionally, as shown schematically in FIG. 2 and FIG. 3, an air knife 115 may be mounted to the wirecutting apparatus for blowing a curtain of air 120 onto the ultrasonic blade 50 to remove fines from the blade 50 when it is retracted to begin its cyclical travel in a looped path.

As shown in detail in FIGS. 4-6, the die insert 30 may have a curvilinear die aperture 130 which contains a plurality of alternating concave portions or sections 135, convex portions or sections 140, and linear portions or sections 145 of varying length. The concave curved portions 135 and the convex curved portions 140 may each have different radii of curvature or differently shaped arcs to provide a random, spooned cookie shape, periphery, or circumference.

The die insert 30 may have a circular input end 150 which fits into the circular die orifice 25 of the wirecutter 1, and an opposing output end 155 which contains the irregularly shaped curvilinear die aperture 130. A flange 160 may be provided near the input end 150 for securing or attaching the die insert 30 to the wirecutter 1 with bolts or other fastening devices which pass through holes 165 in the flange 160. In preferred embodiments, the die insert 30 may have an inner passageway 170 which tapers inwardly or narrows from the circular input end 150 to the irregular output end 155. The inner passageway 170 may have the curvilinear shape of the die aperture 130 which may extend from the output end 155 to or near the input end 150.

Any type of edible inclusion, particulate, or particulate flavoring ingredient, or morsel in any shape or form, such as chips or chunks, may be used in the present invention. The chips or chunks may be confectionary chips, confectionary chunks, flavor chips, flavor chunks, flavor chips, flavor chunks, compound chips or compound chunks, and the terms are used interchangeably herein. A chip or chunk may be a chocolate chip or chocolate chunk, or a flavor compound or confectionary compound such as a butter flavor chip or chunk. A confectionary chip or chunk may be a compound chip that might be chocolate flavored, but is not limited to chocolate flavored. Exemplary inclusions, particulates or particulate flavoring ingredients, or morsels which may be employed in the present invention include white, dark, or milk chocolate chips or chunks, butterscotch chips or chunks, vanilla chips or chunks, butter chips or chunks, peanut butter chips or chunks, coconut chips or chunks, caramel chips or chunks, fruit flavored chips or chunks, or other flavored chips or chunks, raisins, dried or dehydrated cranberries, raspberries, blueberries, strawberries, or other dried berries, fruit pieces, such as dried or dehydrated fruit pieces including apricot, apple, plum, peach, orange, banana, pineapple, mango, currant, sultana, and cherry pieces, nuts, or pieces of nuts such as macadamia nuts, peanuts, walnuts, almonds, hazelnuts, pecans, brazil nuts, pistachios, seeds such as pumpkin seeds, roasted or non-roasted coffee beans, dried or dehydrated vegetable pieces, such as carrot pieces, broccoli pieces, sun dried tomatoes, candy or candy bar pieces, ready-to-eat cereal clusters, and mixtures thereof. Exemplary shapes or forms of the inclusions which may be employed include drop shaped, chunk shaped, slices, diced, chopped or whole, such as whole raisins, whole macadamia nuts, whole peanuts, and mixtures thereof.

In embodiments of the invention, the cookie dough inclusion content may be from about 20% by weight to about 60% by weight, for example from about 25% by weight to about 50% by weight, based upon the total weight of the dough (which includes the weight of the inclusions and the weight of all other dough ingredients). In embodiments of the present invention any inclusion particle size, such as from about 300 count/pound to about 10,000 count/pound may be employed. In preferred embodiments, an inclusion or particulate particle size of from about 500 count/lb to about 1000 count/lb is employed for desirable visual impact, and textural dichotomy. The length, width, height, and diameter of the inclusions for a given count/pound, may vary depending upon the type of inclusion, and its density. Generally, the inclusions employed with a count/pound of from about 500 to about 1000 may have at least one dimension, such as length, which on average is at least about 0.4 inches. For example, cranberries which may be employed may have an average length of about 0.702 inches, an average width of about 0.479 inches, and an average height of about 0.202 inches. Chocolate chunks with a particle size of about 600 count/pound may have an average length of about 0.478 inches, an average width of about 0.367 inches, and an average height of about 0.268 inches. Smaller size range chocolate drops, such as used in conventional wirecutting operations may have a particle size of about 4200 count/pound with an average diameter of about 0.230 inches, and an average height of about 0.228 inches.

In embodiments of the invention, mixtures of inclusions having different particle size ranges may be employed. For example, a mixture of inclusions employable in the present invention may have from about 25% by weight to about 35% by weight large particulates having a particle size of from about 500 count/pound to about 1000 count per pound, and from about 15% by weight to about 25% by weight of smaller particulates having a smaller particle size of from about 4000 count/pound to about 5000 count/pound, based upon the total weight of the dough, for a total particulate load or content of from about 40% by weight to about 60%, based upon the total weight of the dough.

In preferred embodiments of the invention, the particulates are sufficiently large and in sufficiently plentiful amounts so that after baking of the cookie dough, the inclusions extend above the baked cookie dough top surface, as a result of oven spread. Upon baking, the cookie dough spreads to a considerable degree compared to the spread, if any, of the inclusion, such as nuts, raisins, or confectionary or flavor chips or chunks. Accordingly, inclusions contained within the dough may pierce through the dough surface upon baking, and may extend substantially above the cookie surface, to provide a rich, indulgent appearance. For example, in embodiments of the invention, at least about 15%, preferably at least about 25%, most preferably at least about 50% of a dimension, such as height, of a plurality of inclusions may be above the baked dough surface of the cookie. The inclusions, such as confectionary chips or chunks or flavor chips or chunks, and nuts may have a maximum dimension which is greater than the thickness to which the cookie dough spreads to assure piercing of the chips through the top surface of the cookie dough.

As used herein, the term "cookie" is intended to include any baked product being similar to a cookie such as cookies, biscuits, and the like. Similarly, the term "cookie dough" is intended to mean any dough that can be used to make cookies within the broadest meaning of that term. Such a dough is usually an unbaked mixture of ingredients used to make a cookie dough such as flour, shortening (such as for example margarine or butter), fat, one or more than one sugar, such as sucrose, and water. In addition, the dough may contain a leavening agent, e.g. baking powder containing sodium bicarbonate or ammonium bicarbonate.

In embodiments of the invention, the flour component or farinaceous materials employed may be any comminuted cereal grain or edible seed or vegetable meal, derivatives thereof and mixtures thereof. Exemplary of the flour component or farinaceous materials which may be used are wheat flour, corn flour, corn masa flour, oat flour, barley flour, rye flour, rice flour, potato flour, grain sorghum flour, tapioca flour, graham flour, or starches, such as corn starch, wheat starch, rice starch, potato starch, tapioca starch, physically and/or chemically modified flours or starches, such as pregelatinized starches, and mixtures thereof. The flour may be bleached or unbleached. Wheat flour or mixtures of wheat flour with other grain flours are preferred.

The flour component may be replaced in whole or in part by resistant starch ingredients, such as resistant starch type III ingredients, or resistant starch bulking agents, resistant starch flour substitutes, or other flour substitutes or bulking agents, such as polydextrose, hollocellulose, microcrystalline cellulose, mixtures thereof, and the like. Corn bran, wheat bran, oat bran, rice bran, mixtures thereof, and the like may also be substituted in whole or in part for the flour component to enhance color, or to affect texture. The amount of the bulking agent, or flour substitute or resistant starch ingredient such a resistant starch type III ingredient, may generally be at least about 25% by weight, for example at least about 40% by weight, preferably from about 50% by weight to about 75% by weight, based upon the total weight of the bulking agent or flour substitute and the flour component, such as conventional, ungelatinized wheat flour.

In embodiments of the invention, the total amount of the flour component and the optional bulking agent, flour substitute, or resistant starch ingredient, such as resistant starch type bulking agent which may be used in the compositions of the present invention may range, for example, from about 20% by weight to about 80% by weight, preferably from about 45% by weight to about 75% by weight, based upon the weight of the dough, not including the weight of inclusions. Unless otherwise indicated, all weight percentages are based upon the total weight of all ingredients forming the doughs or formulations of the present invention, except for inclusions such as confectionary or flavor chips or chunks, nuts, raisins, and the like. Thus, "the weight of the dough" does not include the weight of inclusions, but "the total weight of the dough" does include the weight of inclusions.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments of the present invention, the total sugar solids content, or the texturizing ingredient content, of the doughs of the present invention may range from zero up to about 50% by weight, based upon the weight of the dough, not including the weight of inclusions.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making reduced calorie baked goods. Exemplary replacement amounts may be at least about 25% by weight, for example at least about 40% by weight, preferably from about 50% by weight to about 75% by weight, of the original sugar solids content.

In embodiments of the invention, the amount of the conventional sugar substitute, conventional bulking agent, or conventional flour substitute, such as polydextrose, may be from about 10% by weight to about 35% by weight, for example from about 15% by weight to about 25% by weight, based upon the weight of the dough, not including the weight of the inclusions.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), the moisture content of any bulking agent or flour substitute such as a resistant starch type III ingredient, and the moisture content of other dough additives included in the formulation, such as high fructose corn syrup, invert syrups, or other liquid humectants.

Taking into account all sources of moisture in the dough or batter, including separately added water, the total moisture content of the doughs or batters which may be used in the present invention is generally less than about 50% by weight, preferably less than about 35% by weight, based upon the weight of the dough or batter, not including the weight of the inclusions. For example, cookie doughs employed in the present invention may have a moisture content of less than about 30% by weight, generally from about 10% by weight to about 20% by weight, based upon the weight of the dough, not including the weight of inclusions.

Oleaginous compositions which may be used to obtain the doughs and baked goods of the present invention may include any known shortening or fat blends or compositions, useful for baking applications, such as butter, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

Baked goods which may be produced in accordance with the present invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs of the invention may include other additives conventionally employed in crackers and cookies. Such additives may include, for example, milk by-products, egg or egg by-products, cocoa, vanilla or other flavorings, in conventional amounts.

A source of protein, which is suitable for inclusion in baked goods, may be included in the doughs employed in the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough, not including the weight of inclusions.

The dough compositions of the present invention may contain up to about 5% by weight of a leavening system, based upon the weight of the dough, not including inclusions. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs employed in the present invention may include antimycotics or preservatives, such as calcium propionate, potassium sorbate, sorbic acid, and the like. Exemplary amounts, to assure microbial shelf-stability, may range up to about 1% by weight of the dough, not including the weight of inclusions.

Emulsifiers may be included in effective, emulsifying amounts in the doughs of the present invention. Exemplary emulsifiers which may be used include, mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough, not including the weight of inclusions.

Production of the doughs of the present invention may be performed using conventional dough mixing techniques and equipment used in the production of cookie and cracker doughs.

While baking times and temperatures will vary for different dough or batter formulations, oven types, etc., in general, commercial cookie, brownie and cake-baking times may range from about 2.5 minutes to about 15 minutes, and baking temperatures may range from about 250° F. (121° C.) to about 600° F. (315° C.).

The baked products of the present invention may have a relative vapor pressure ("water activity") of less than about 0.7, preferably less than about 0.6, for preservative free microbial shelf-stability. Cookie, brownie and cake products generally have a moisture content of less than about 20% by weight, for example, from about 2% by weight to about 9% by weight for cookies, based upon the weight of the baked product, exclusive of inclusions.

The cookie dough or batter compositions employed in the present invention may be used for the production of reduced calorie, reduced fat, low fat, no-fat, or full fat cookies such as drop-type cookies such as chocolate chip cookies, oatmeal cookies, sugar cookies, chocolate cookies, vanilla cookies, gingerbread cookies, peanut butter cookies, butterscotch cookies, short bread cookies, fruit cookies, and the like, containing high amounts of large particulates. The cookies may be made in a variety of sizes, for example cookies having a maximum diameter of from about 1.5 inches to about 4 inches, preferably about 2 inches to about 3.5 inches, most preferably from about 2.75 inches to about 3.25 inches.

The present invention is further illustrated in the following examples, where all parts, ratios, and percentages are by weight, and all temperatures are in ° F., unless otherwise stated:

EXAMPLE 1

The ingredients and their relative amounts, which may be used to produce an oatmeal cookie having high amounts of 600 to 1000 count/pound cranberry and macadamia nut inclusions and a home-baked appearance in accordance with the present invention are:

| DOUGH INGREDIENT | PARTS BY WEIGHT | WEIGHT % |
|---|---|---|
| GROUP 1 | | |
| Butter | 80.00 | 16.54 |
| Fine Grain Sugar, sucrose | 55.25 | 11.42 |
| Light Brown Sugar | 55.25 | 11.42 |
| Salt | 2.00 | 0.41 |
| Liquid Fructose | 25.38 | 5.24 |
| Flavoring | 2.88 | 0.60 |
| GROUP 2 | | |
| Spray Dried Eggs | 3.00 | 0.62 |
| Water | 8.25 | 1.71 |
| Vanilla | 2.00 | 0.41 |
| GROUP 3 | | |
| Rolled Oats | 20.00 | 4.14 |
| Wheat Flour | 100.00 | 20.68 |
| Sodium Bicarbonate | 2.14 | 0.44 |
| Ammonium Bicarbonate | 0.50 | 0.10 |
| Water | 2.00 | 0.41 |
| GROUP 4 | | |
| Cranberries | 75.00 | 15.52 |
| Macadamia Nuts, diced | 50.00 | 10.34 |
| TOTAL | 483.65 | 100.0 |

The cranberries may have an average length of about 0.7 inches, an average width of about 0.5 inches, and an average height of about 0.2 inches. The Macadamia nuts may have an average length of about 0.4 inches, an average width of about 0.35 inches, and an average height of about 0.3 inches.

The dough may be produced by first blending the Group 1 ingredients for about three minutes at high speed. The Group 2 ingredients may then be added to the Group 1 ingredients with mixing for about two minutes at low speed, followed by addition of the Group 3 ingredients with mixing for an additional two minutes at low speed. The Group 4 ingredients may then be added and mixing may be continued for three minutes at low speed to obtain a substantially homogeneous dough.

The dough may be placed onto a lay-time conveyor for about 30 minutes for hydration purposes. The dough may then be transferred to the hopper of a wirecut apparatus as shown in FIGS. 1-6. The wirecut apparatus may be a conventional wirecutter manufactured by APV Baker, Baker Perkins Group Ltd., which is modified to include two ultrasonic cutters containing ultrasonic cutter components and blades manufactured by Dukane Corporation, St. Charles Ill. The Dukane Corporation ultrasonic components for each ultrasonic cutter may include an ultrasonic generator/power supply, an ultrasonic converter, which converts the generator signal into mechanical motion through the use of piezoelectric crystals (approximately 20μ of amplitude peak to peak), a booster, a horn, and an ultrasonic cutting blade which is connected to the booster through the horn. Each ultrasonic cutting blade may be a half wave wedge guillotine blade which is 6 inches in length.

Each ultrasonic blade may be set so that the distance between the top surface of the blade and the bottom of the die insert is $10/1000$ of an inch. The booster may be set to about 40% (0.4:1 ratio booster) to reduce the blade amplitude by about 60%. A linear air nozzle or air knife made by Exair Corporation of Cincinnati, Ohio may be employed to remove fines from the top of the blade.

The cookie dough may be extruded through four dies, as shown in FIGS. 1-3 each having an inner diameter or orifice of about 2 inches to obtain four extrudate dough ropes. Each die may be fitted with an irregular die insert having an aperture or exit orifice inner diameter of about 2 inches, as shown in detail in FIGS. 4-6. The four extrudate dough ropes may be cut simultaneously using the two ultrasonic cutters to obtain dough pieces which fall about two inches from the exit of the die insert to the underlying conveyor belt in a substantially regular array as shown in FIGS. 1-3. The conveyor belt may be a 16 inch wide oven band. The dough pieces may have a curvilinear circumference or perimeter as provided by the die insert.

The wirecutter may be set to attain a target dough piece weight of 30 grams per piece. A plurality of dough pieces may be taken from the array, and weighed to determine the dough weight variation. The dough weights for a sample size of about 14 dough pieces may range from about 27 grams to about 33 grams, for a dough weight variation of 10% from the target dough weight (33−30=3 and 30−27=3, so the dough weight variation is 3/30×100=10%). The dough may be wirecut using a conventional wirecutter and wire blade with no ultrasonic cutting. The dough weights for the same sample size may range from about 24 grams to about 36 grams, for a dough weight variation of about 20% from the 30 gram target weight (6/30×100=20%). Thus, use of the ultrasonic cutter in accordance with the present invention reduces the dough weight variation by about 50% (10/20=50%).

The dough pieces on the oven band may be transported to a band oven having five zones for baking into cookies. The dough pieces may be baked at top zone temperatures ranging from about 250° F. to about 400° F., and bottom zone temperatures of about 200° F. to about 325° F. and the baking time may be about 10 minutes. The cookies may have a moisture content of about 5.5% by weight and a maximum diameter of about 3 inches.

The cookies may have a curvilinear periphery, like a home baked, spooned cookie, with desirable surface cracks and crevices, and no pock marks or craters caused by dragging or loss of particulates during dough piece formation. The cookies may also have a large number of the inclusions with substantial portions thereof extending above the surrounding baked dough portions to provide a rich, indulgent appearance.

EXAMPLE 2

The ingredients and their relative amounts, which may be used to produce a chocolate chunk cookie having high amounts of large chocolate inclusions and a home-baked appearance in accordance with the present invention are:

| DOUGH INGREDIENT | PARTS BY WEIGHT | WEIGHT % |
|---|---|---|
| GROUP 1 | | |
| Butter | 55.00 | 13.30 |
| Fine Grain Sugar, sucrose | 40.00 | 9.67 |
| Light Brown Sugar | 2.00 | 0.48 |
| Salt | 1.50 | 0.36 |
| Cocoa | 5.00 | 1.21 |
| GROUP 2 | | |
| Spray Dried Eggs | 2.00 | 0.48 |
| Liquid Fructose | 2.00 | 0.48 |
| Water | 17.19 | 4.15 |
| Vanilla and Chocolate Flavor | 5.00 | 1.21 |
| GROUP 3 | | |
| Wheat Flour | 100.0 | 24.18 |
| Sodium Bicarbonate | 1.25 | 0.30 |
| Ammonium Bicarbonate | 0.16 | 0.04 |
| GROUP 4 | | |
| Semi Sweet Chocolate Chunks 1,000 count/lb | 65.00 | 15.72 |
| Medium White Chocolate Chunks 1,000 count/lb | 67.50 | 16.32 |
| Chocolate Chips 10,000 count/lb | 50.00 | 12.10 |
| TOTAL | 413.60 | 100.0 |

The dough may be produced by first blending the Group 1 ingredients for about four minutes at low speed. The Group 2 ingredients may then be added to the Group 1 ingredients with mixing for about two minutes at low speed, followed by addition of the Group 3 ingredients with mixing for an additional four minutes at low speed, and the ammonium bicarbonate being pre-dissolved in water. The Group 4 ingredients may then be added and mixing may be continued for 1.5 minutes at low speed to obtain a substantially homogeneous dough.

The dough may be placed onto a lay-time conveyor for about 30 minutes for hydration purposes. The dough may then be transferred to the hopper of a wirecut apparatus. The dough may then be ultrasonically cut as in Example 1, with a dough piece weight variation of less than about 10%, and then baked as in Example 1 to obtain cookies may have a curvilinear periphery, like a home baked, spooned cookie, with desirable surface cracks and crevices, and no pock marks or craters caused by dragging or loss of particulates during dough piece formation. The cookies may also have a large number of the inclusions with substantial portions thereof extending above the surrounding baked dough portions to provide a rich, indulgent appearance.

EXAMPLE 3

A chocolate chunk cookie may be produced as in Example 2 except the 1000 count/lb medium white chocolate chunks may be replaced by an equal weight of random diced 600 count/lb white chocolate chunks.

What is claimed is:

1. Apparatus for the continuous production of cookies having a high content of large inclusions comprising a wirecut machine having a plurality of die orifices, a plurality of ultrasonic cutters which are each attached to the wire cut machine and which each have an ultrasonic cutting blade, and a conveyor belt located below the wirecut machine, wherein the ultrasonic cutting blades travel in a looped path and are synchronized to cut across a plurality of die apertures which are above the moving conveyor to ultrasonically cut vertically oriented dough ropes extruded from the plurality of die apertures to obtain dough pieces which fall onto the moving conveyor in a substantially uniform array of rows, each of the ultrasonic cutters being configured to provide the ultrasonic cutting blades with an amplitude of blade motion which is 12 microns to 18 microns.

2. Apparatus for the continuous production of cookies as claimed in claim 1 wherein each blade has its own ultrasonic components comprising an ultrasonic power supply, converter, and booster, so that the amplitude of each blade may be adjusted independently.

3. Apparatus for the continuous production of cookies as claimed in claim 2 wherein the plurality of ultrasonic cutters are journaled or connected together or mounted or attached to a single reciprocating mechanism to synchronize their movement for cutting a plurality of at least substantially vertically oriented extrudate dough ropes so that all of the blades contact and cut one or a plurality of different extrudate ropes at least substantially simultaneously so that the cut dough pieces fall in an at least substantially uniform straight row across the oven band.

4. Apparatus for the continuous production of cookies as claimed in claim 2 having a power supply to said ultrasonic cutting blades which is varied to produce surface roughness on the dough pieces.

5. Apparatus for the continuous production of cookies as claimed in claim 2 wherein each of the ultrasonic cutting blades is mounted to a booster and the booster varies the amplitude of said ultrasonic cutting as the blade cuts across the dough rope to provide a roughened top surface on the dough piece.

6. Apparatus for the continuous production of cookies as claimed in claim 2 where the ultrasonic cutting blades are half wave guillotine, half wave edge guillotine, full wave guillotine, or full wave wedge guillotine cutting blades.

7. Apparatus for the continuous production of cookies as claimed in claim 6 having 3 or 4 ultrasonic cutting blades across the oven band.

8. Apparatus for the continuous production of cookies as claimed in claim 2 wherein each ultrasonic cutter is mounted on the wirecutter so that the cutting of the dough rope occurs in the same direction that the underlying conveyor belt and cut dough pieces thereon are moving.

9. Apparatus for the continuous production of cookies as claimed in claim 2 wherein each ultrasonic cutter is mounted on the wirecutter so that the cutting of the dough rope occurs in the direction opposite to the movement of the underlying conveyor belt and cut dough pieces which have fallen upon the conveyor.

10. Apparatus for the continuous production of cookies as claimed in claim 2 wherein each blade cuts upwards towards a die aperture and then cuts downward away from the die aperture, at about 60% to about 90% across the maximum width, thickness, or diameter of the die aperture.

11. Apparatus for the continuous production of cookies as claimed in claim 10 wherein upon cutting the dough rope the top edge of each blade is at a distance of less than about 20/1000 inches from the die aperture.

12. Apparatus for the continuous production of cookies as claimed in claim 2 wherein each die aperture comprises a plurality of alternating concave, convex, and linear portions or sections of varying length, the concave and convex curved portions having different radii of curvature or differently shaped arcs.

13. Apparatus for the continuous production of cookies as claimed in claim 1 further comprising a die insert for each die aperture, the die insert having a circular input end which fits into a circular die orifice or aperture of the wirecutter, and an opposing output end which contains an irregularly shaped curvilinear die exit aperture, the die insert having an inner passageway which tapers inwardly or narrows from the circular input end to the irregular output end so as to compress the dough and conform it to the irregular shape of the die exit aperture.

14. Apparatus for the continuous production of cookies as claimed in claim 13 wherein the die exit aperture of the die insert comprises a plurality of alternating concave, convex, and linear portions or sections of varying length, the concave and convex curved portions having different radii of curvature or differently shaped arcs.

15. Apparatus for the continuous production of cookies as claimed in claim 1 further comprising a linear air nozzle or air knife for each ultrasonic cutting blade which provides a curtain of air to the ultrasonic cutting blade surfaces.

16. Apparatus for the continuous production of cookies as claimed in claim 15 wherein the linear air nozzle or air knife is mounted on the wirecutter, underneath and upstream of the die orifice in a fixed position over each of the ultrasonic blades.

17. Apparatus for the continuous production of cookies as claimed in claim 1 wherein each blade has its own ultrasonic power supply, and the power supply to each ultrasonic cutting blade is varied to lower the power supply input and increase friction during cutting as the blade travels across the dough rope to produce surface roughness on the dough pieces.

18. Apparatus for the continuous production of cookies having a high content of large inclusions comprising a wirecut machine having a plurality of die orifices, a plurality of ultrasonic cutters which are each attached to the wire cut machine and which each have an ultrasonic cutting blade, and a conveyor belt located below the wirecut machine, wherein the ultrasonic cutting blades travel in a looped path and are synchronized to cut across a plurality of die apertures which are above the moving conveyor to ultrasonically cut vertically oriented dough ropes extruded from the plurality of die apertures to obtain dough pieces which fall onto the moving conveyor in a substantially uniform array of rows, each of the ultrasonic cutting blades having its own ultrasonic power supply, and the power supply to each ultrasonic cutting blade is varied to lower the power supply input and increase friction during cutting as the blade travels across the dough rope using an amplitude of 10 to 19 microns.

19. Apparatus for the continuous production of cookies as claimed in claim 18 wherein the plurality of ultrasonic cutters are journaled or connected together or mounted or attached to a single reciprocating mechanism to synchronize their movement for cutting a plurality of at least substantially vertically oriented extrudate dough ropes so that all of the blades contact and cut one or a plurality of different extrudate ropes at least substantially simultaneously so that the cut dough pieces fall in an at least substantially uniform straight row across the oven band, and each of the ultrasonic cutting blades is mounted to a booster and the booster varies the amplitude of said ultrasonic cutting as the blade cuts across the dough rope to provide a roughened top surface on the dough piece.

20. Apparatus for the continuous production of cookies as claimed in claim 19 further comprising:
 a) a die insert for each die aperture, the die insert having a circular input end which fits into a circular die orifice or aperture of the wirecutter, and an opposing output end which contains an irregularly shaped curvilinear die exit aperture, the die insert having an inner passageway which tapers inwardly or narrows from the circular input end to the irregular output end so as to compress the dough and conform the dough to the irregular shape of the die exit aperture, the die exit aperture of the die insert comprising a plurality of alternating concave, convex, and linear portions or sections of varying length, the concave and convex curved portions having different radii of curvature or differently shaped arcs, and
 b) a linear air nozzle or air knife for each ultrasonic cutting blade which provides a curtain of air to the ultrasonic cutting blade surfaces.

* * * * *